United States Patent
Gourley et al.

(10) Patent No.: US 11,640,419 B2
(45) Date of Patent: May 2, 2023

(54) MANAGEMENT OF EVENT SUMMARY TYPES

(71) Applicant: Primer Technologies, Inc., San Francisco, CA (US)

(72) Inventors: Sean William-Joseph Gourley, San Francisco, CA (US); Leonard Apeltsin, Berkeley, CA (US); Amy Heineike, Albany, CA (US); Emmanuel Ramon Yera, San Francisco, CA (US); John Neil Bohannon, San Francisco, CA (US)

(73) Assignee: Primer Technologies, Inc., San Francisco, CA (US)

( * ) Notice: Subject to any disclaimer, the term of this patent is extended or adjusted under 35 U.S.C. 154(b) by 72 days.

(21) Appl. No.: 16/166,764

(22) Filed: Oct. 22, 2018

(65) Prior Publication Data

US 2019/0130031 A1 May 2, 2019

Related U.S. Application Data

(60) Provisional application No. 62/579,633, filed on Oct. 31, 2017.

(51) Int. Cl.
*G06F 16/34* (2019.01)
*G06F 16/953* (2019.01)
*G06F 16/9535* (2019.01)
*G06F 16/248* (2019.01)
*G06F 40/166* (2020.01)

(52) U.S. Cl.
CPC .......... *G06F 16/345* (2019.01); *G06F 16/248* (2019.01); *G06F 16/953* (2019.01); *G06F 16/9535* (2019.01); *G06F 40/166* (2020.01)

(58) Field of Classification Search
CPC .... G06F 16/345; G06F 16/248; G06F 16/953; G06F 16/9535; G06F 40/166
See application file for complete search history.

(56) References Cited

U.S. PATENT DOCUMENTS

| | | | | |
|---|---|---|---|---|
| 8,099,674 B2* | 1/2012 | Mackinlay | ............ | G06F 16/252 715/764 |
| 8,434,001 B2* | 4/2013 | Kandekar | ............ | G06F 15/0291 715/234 |
| 8,595,220 B2* | 11/2013 | Drucker | ................ | G06F 16/285 707/723 |
| 8,825,679 B2* | 9/2014 | Kikin-Gil | ............. | G06F 16/338 707/755 |
| 8,887,035 B2* | 11/2014 | McDonald | ............. | G06Q 10/00 715/203 |
| 8,990,065 B2* | 3/2015 | Raskino | ................ | G06F 16/345 704/7 |

(Continued)

*Primary Examiner* — Benjamin Smith

(57) ABSTRACT

Systems, methods, and software described herein provide enhancements of managing summaries provided to end users. In one implementation, a summary service provides a user with identifier for a plurality of events, and obtains a selection from the user, wherein the selection identifies a first type of summary for an event in the plurality of events. The summary service further provides the user with a first summary of the first type for the event, identifies one or more suggested types of summaries for the event based at least in part on data points for the event, and provides the one or more suggested types of summaries to the user.

10 Claims, 11 Drawing Sheets

(56) References Cited

U.S. PATENT DOCUMENTS

| | | | |
|---|---|---|---|
| 9,055,115 B2* | 6/2015 | Bell | G06F 16/489 |
| 9,262,483 B2* | 2/2016 | Drucker | G06F 16/285 |
| 9,274,683 B2* | 3/2016 | Fey | G06F 16/951 |
| 9,355,160 B2* | 5/2016 | Wolfram | G06F 16/258 |
| 9,424,318 B2* | 8/2016 | Anand | G06F 16/24578 |
| 9,471,629 B2* | 10/2016 | Thope | G06F 16/245 |
| 9,558,165 B1* | 1/2017 | Marsten | G06F 40/284 |
| 9,600,528 B2* | 3/2017 | Mackinlay | G06F 16/252 |
| 9,613,086 B1* | 4/2017 | Sherman | G06F 16/248 |
| 9,613,102 B2* | 4/2017 | Anand | G06F 16/24578 |
| 9,710,527 B1* | 7/2017 | Sherman | G06F 16/248 |
| 9,727,647 B1* | 8/2017 | Hensel | G06F 16/29 |
| 9,779,150 B1* | 10/2017 | Sherman | G06F 16/26 |
| 9,798,440 B2* | 10/2017 | Piantino | G06F 3/0481 |
| 9,881,077 B1* | 1/2018 | Alfonseca | G06F 16/35 |
| 9,977,829 B2* | 5/2018 | Simske | G06F 16/3326 |
| 10,296,159 B2* | 5/2019 | Hamlin | G06F 3/0481 |
| 10,585,930 B2* | 3/2020 | Allen | G06F 16/345 |
| 10,803,245 B2* | 10/2020 | Alonso | H04L 67/306 |
| 2007/0061611 A1* | 3/2007 | Mackinlay | G06F 16/2379 714/5.1 |
| 2011/0314041 A1* | 12/2011 | Drucker | G06F 16/345 707/769 |
| 2012/0056901 A1* | 3/2012 | Sankarasubramaniam | G06F 3/005 345/660 |
| 2012/0209850 A1* | 8/2012 | Kikin-Gil | G06F 16/338 707/738 |
| 2012/0210203 A1* | 8/2012 | Kandekar | G06F 15/0291 715/230 |
| 2013/0073976 A1* | 3/2013 | McDonald | G06Q 10/00 715/739 |
| 2013/0073985 A1* | 3/2013 | Hamlin | G06F 3/0481 715/753 |
| 2013/0268839 A1* | 10/2013 | Lefebvre | G06Q 10/107 715/234 |
| 2014/0046960 A1* | 2/2014 | Drucker | G06Q 30/02 707/748 |
| 2014/0229497 A1* | 8/2014 | Wolfram | G06F 16/26 707/758 |
| 2014/0317130 A1* | 10/2014 | Thope | G06F 16/245 707/754 |
| 2015/0081692 A1* | 3/2015 | Mackinlay | G06Q 40/025 707/733 |
| 2015/0278214 A1* | 10/2015 | Anand | G06F 16/338 707/748 |
| 2015/0278371 A1* | 10/2015 | Anand | G06F 16/338 707/723 |
| 2015/0302083 A1* | 10/2015 | Simske | G06F 16/313 707/750 |
| 2016/0224676 A1* | 8/2016 | Miller | G06F 17/30365 |
| 2017/0116314 A1* | 4/2017 | Aoun | G06F 16/9535 |
| 2017/0161372 A1* | 6/2017 | Fernandez | G06F 16/35 |
| 2017/0293415 A1* | 10/2017 | Mackinlay | G06F 3/04817 |
| 2018/0011931 A1* | 1/2018 | Modani | G06F 40/30 |
| 2018/0032525 A1* | 2/2018 | Allen | G06F 16/248 |
| 2018/0032609 A1* | 2/2018 | Allen | G06F 16/345 |
| 2018/0039708 A1* | 2/2018 | Gourley | G06Q 10/06 |
| 2018/0067910 A1* | 3/2018 | Alonso | H04L 67/306 |
| 2018/0129634 A1* | 5/2018 | Sivaji | G06F 40/131 |
| 2018/0189294 A1* | 7/2018 | Anand | G06F 16/24578 |
| 2018/0314393 A1* | 11/2018 | Filippi | G06F 16/345 |

* cited by examiner

MANAGEMENT OF EVENT SUMMARY TYPES

RELATED APPLICATIONS

This application hereby claims the benefit of and priority to U.S. Provisional Patent Application No. 62/579,633, titled "MANAGEMENT OF EVENT SUMMARY TYPES," filed Oct. 31, 2017, and which is hereby incorporated by reference in its entirety.

BACKGROUND

News sources often generate images, articles, graphs, and other similar objects that are used in providing information about a particular event. These events may include financial events, world news events, local news events, among other possible events. The objects generated may include various facts, relevant images, or other similar data that can be used in providing a reader or viewer with information about the particular event. However, although news stories may provide information about a particular event, different news stories may provide different information, and may even provide false information. As a result, readers and viewers of the objects may find it difficult to identify important information within the objects, as well determine the information that is factually correct.

OVERVIEW

Provided herein are enhancements for managing and providing event summaries to end users. In one implementation, a method of operating a summary service to provide event summary information includes providing a user with identifiers for a plurality of events. The method further includes obtaining a selection from the user, wherein the selection identifies an event of the plurality of events. The method also provides identifying one or more suggested types of summaries for the event based at least in part on previous summary type selections by the user to previous events, and providing the one or more suggested types of summaries to the user.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
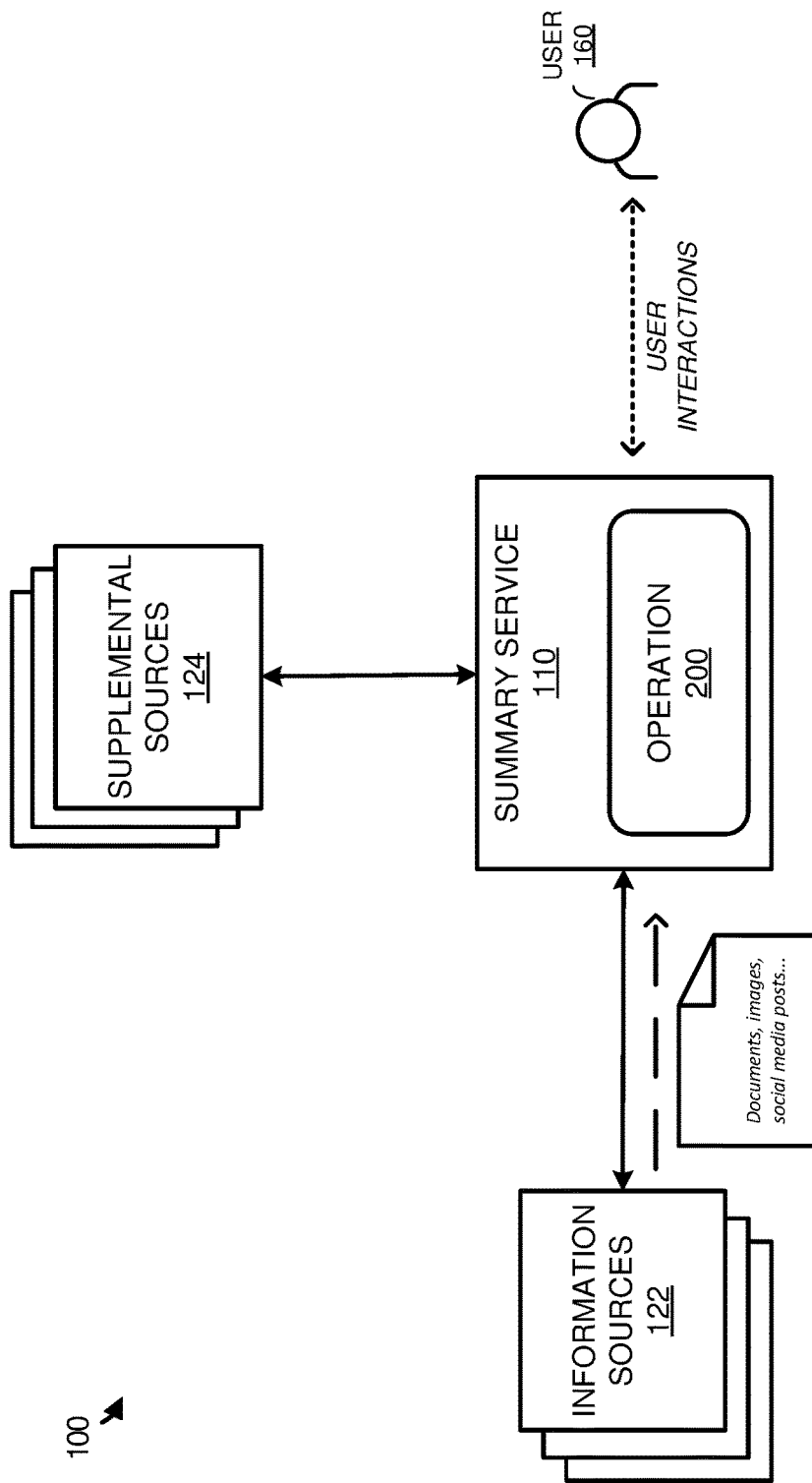
FIG. 1 illustrates a computing environment for multi-source event summarization according to an implementation.

FIG. 1 illustrates a computing environment 100 for multi-source event summarization according to an implementation. Computing environment 100 includes information sources 122, summary service 110, supplemental sources 124, and user 150. Summary service 110 communicates with information sources 122 and supplemental sources 124 via various communication links, and implements event operation 200 using objects received from sources 122 and 124.

In operation, information sources 122 generate objects, such as text news stories, documents, social media posts, images, graphs, and other similar objects to provide information about various topics. For example, an information source in information sources 122 may generate a news article for a death of a diplomatic leader. As the objects are generated, the objects are obtained by summary service 110, wherein summary service 110 executes event operation 200 to provide event summaries based on the information provided by the information sources. In particular, to generate the summaries, summary service 110 may identify events based on the objects received and classify the events, such that information about the events may be provided to a user of summary service 110.

In some implementations, in providing the summaries to user 160, summary service 110 may be used to determine how the summaries are provided to the requesting user. For example, summary service 110 may include various methods of displaying information for each of the events. These methods may include providing a text based summary of an event (e.g. a paragraph or more of text derived from the objects that were used in identifying the event), providing a graph for information related to when the objects were created, summaries of quotes related to an event, summaries that identify and summarize key numbers within objects related to an event, or some other similar summary type for an event. In determining which of the summaries are to be provided, summary service 110 may use various information (data points) from the event objects, as well as machine learning to identify traits of the requesting user and other users of the summary service.

Figure 2:
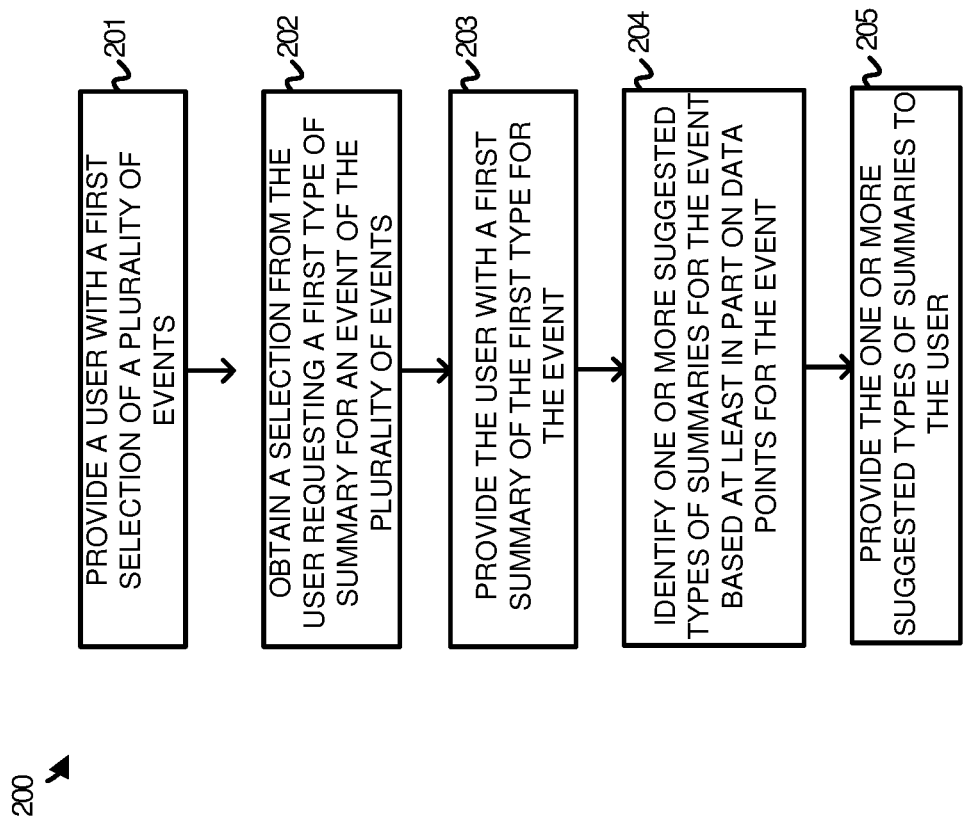
FIG. 2 illustrates an operation of a computing system for providing multi-source event summarization according to an implementation.

FIG. 2 illustrates an operation 200 of a computing system for providing multi-source event summarization according to an implementation. Operation 200 is described parenthetically in the paragraphs that follow with reference to systems and elements of computing environment 100 of FIG. 1.

As described previously, summary service 110 receives objects from information sources 122 to identify events, such as political events, sporting news events, popular culture events, births, deaths, marriages, corporate events (e.g., initial public offerings, bankruptcies, mergers, stock price changes, product and service introductions, law suits and personnel changes), legal events and proceedings, community events, and military events and actions. Events may further include entities in some examples, such as individuals, groups, or organizations, and may further comprise locations, such as cities, regions, and the like. The events may have occurred in the past, may be ongoing, or could be events that are in the future. In identifying the events, objects are obtained from sources 122, wherein the sources may comprise feeds, webpages, databases, and the like. Once the objects are obtained, information (or data points) from the objects is extracted and used in determining whether an event should be identified. This may include similarities between content in multiple objects, the period for which the content was identified, the source or sources of the objects, or some other similar information. Once an event is identified, the objects identified from information source 122 may be used in generating summaries for the event. Additionally, in some examples, such as that depicted in computing environment 100 of FIG. 1, summary service 110 may use the information from supplemental sources 124 in generating the summary. These supplemental sources may comprise databases, resource webpages, or some other similar resource that can be used to provide background and/or support information for the event. For example, if a person is identified within a plurality of internet articles that form the basis of an event, supplemental sources 124 may be used to retrieve additional information about the person of interest. This information, which may be retrieved as an object for the event, may then be used in generating summaries of the event for a requesting user.

In the present implementation, in providing the summaries to an end user, operation 200 includes providing (201) a user with a first selection of a plurality of events. For example, user 160 may provide summary service 110 with a request to identify the ten most recently identified events, wherein the events may be centered around a particular topic (e.g. a particular company), or may be provided across a range of topics. Once the plurality of events is provided to user 160, operation 200 obtains (202) a selection from the user requesting a first type of summary for an event in the plurality of events. Returning to the example of the ten most recent events, user 160 may be provided with a headline for each of the events derived from the objects used for the events. From the headlines, the user may desire and request a summary of a particular of event. In at least one implementation, each of the events (or headlines) may be associated with a particular number, letter, or other identifier. As a result, when the user requests a first type of summary, the user may be provided with a prompt wherein the user may provide input that selects "SUMMARY EVENT X," where X stands for the identifier of the event. In other implementations, in selecting the summary for an event the user may select the event and/or a summary type indicator associated with the event, or may provide any other similar selection process to select a particular event and a summary type associated with the event.

In response to the user selecting the summary type and the event, operation 200 provides (203) the user with a first summary of the first type for the event. This summary may include various information for the event derived from the information and attributes within the objects identified for the event from information sources 122 and supplemental sources 124. For example, a first summary of an event may comprise a text based summary that includes information (data points) obtained from the objects, wherein the text based summary may include quotes from the objects of the event, text generated via a natural language generation element of summary service 110, images, videos, and audio files derived from the objects, or some other similar summary. As an example, the summary may comprise a paragraph that includes information from the objects, which may be identified as important based on the frequency the information was included in the objects, the type of source that the information was derived from, the location of the information within the objects, or some other similar method of identifying information for the summary.

After the first summary is provided to user 160, operation 200 further identifies (204) one or more suggested types of summaries for the event based at least in part on data points for the event. Referring to the example of the paragraph above, in some implementations, summary service 110 may be capable of providing users with various summary versions of a particular event, wherein different summaries may provide more important or relevant information than other summaries. For example, a particular event may comprise a large quantity of numbers, wherein the summary of the numbers may assist the user in better understanding the event. Meanwhile, another event may involve dates, and a summary of the relevant dates may be more important to providing the summary of the event to the end user. As a result of this configuration, summary service 110 may identify which of the summary types would be most beneficial to user 160 and provide suggestions of the summary types to the user. In some implementations, summary service 110 may inspect the data points or information that is identified as relevant for the event, and based on the data points identify a summary type that is relevant for the user. For example, a timeline may be beneficial in summarizing an event with a large amount of dates, while a list of relevant numbers may be beneficial in summarizing an event with a large quantity of numbers (financial information, sports scores, etc.).

Once the summary types are identified for the user, operation 200 provides (205) the one or more suggested types of summaries to the user. In some implementations, in providing the summary types to the user, summary service 110 may prioritize the summary types to be provided to the user. This prioritization may include providing the types as a list, highlighting particular types of summaries, making certain types of summaries more prevalent in the display to the user, or some other similar method of prioritizing and/or emphasizing favored summary types. In some implementations, in identifying the suggested types for the user, summary service 110 may be used to omit some types of summaries that would not be relevant to the user. For example, if an event did not include any quotes, then a summary of quotes would not be relevant for the event.

Although described in the previous example as using the data points from the objects associated with the events to determine the summary type suggestions, it should be understood that other information may also be used in addition to, or in place of, the data points of the event to identify the summary types that are provided to user 160. In at least one implementation, summary service 110 may be capable of learning tendencies of the user to provide the user with information that the user has deemed as relevant. For example, if user 160 favors numbers for particular types of events (e.g. events identified as related to finance), then the summaries related to numbers may be promoted over other types of summaries. Similarly, if the user prefers images to be used for a summary for particular types of events, then the user may be provided with summary types that involve images over other types of summary information. Further, in some implementations, in addition to selection preferences of user 160, summary service 110 may also incorporate selections from other users of the service. These selections may include selections related to the same ever as selected by user 160, and may further include selections of users to other events similar to the current event.

Figure 3:
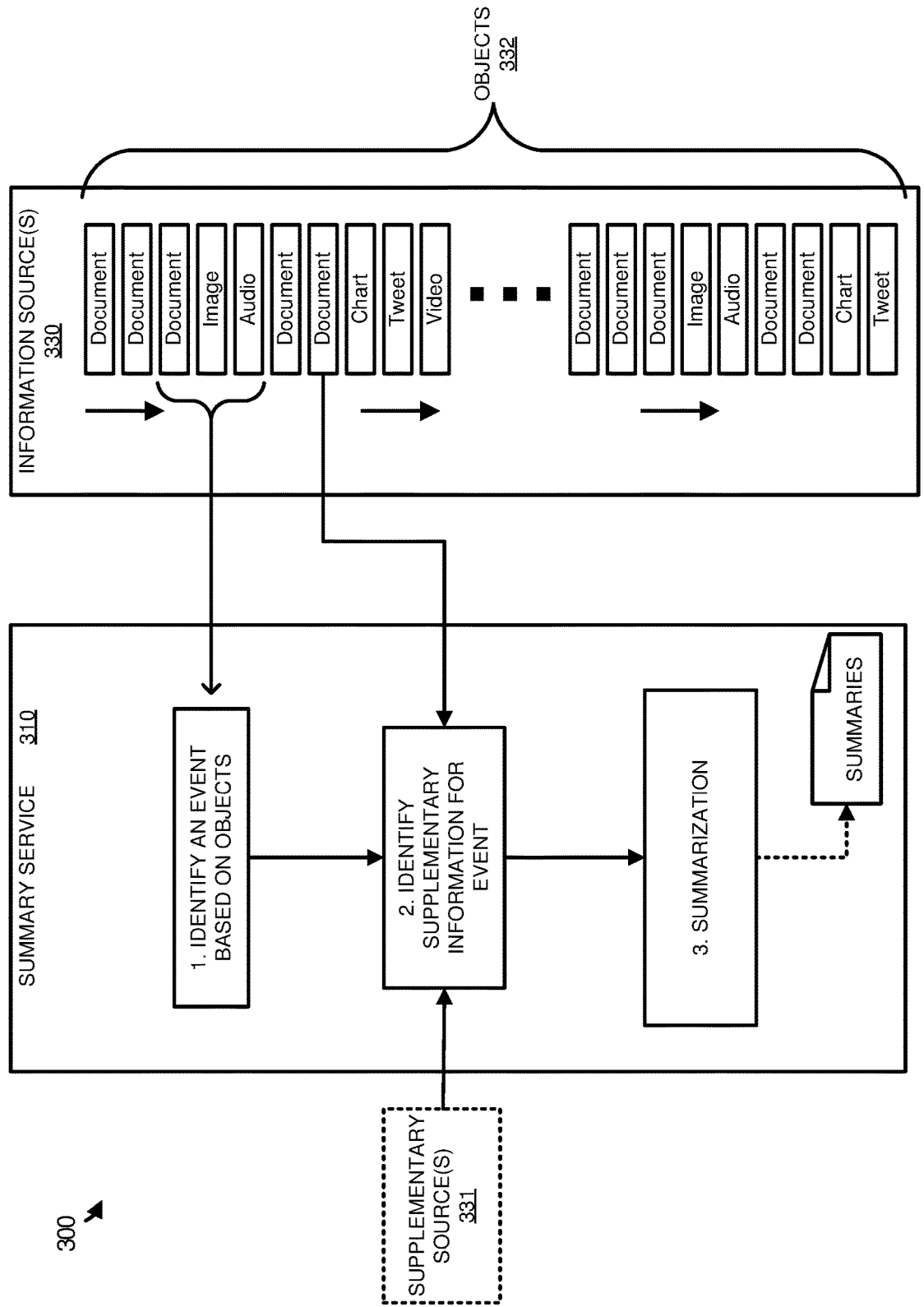
FIG. 3 illustrates an environment to generate event summaries according to an implementation.

FIG. 3 illustrates a computing environment 300 to generate event summaries according to an implementation. Computing environment 300 includes summary service 310, information sources 330, supplementary sources 331, and objects 332.

In operation, summary service 310, at step 1, identifies an event based on objects supplied from information sources 330. In particular, objects 332 are supplied by information sources 330, wherein the objects may include documents, audio files, images, social media messages, or any other similar object from a news source, social media site, or other similar site. As the objects are retrieved, characteristics of the object are determined, which may include the source of the object, the content of the object, the time of the object, or other similar information, and the characteristics may be compared to other objects to determine if an event has occurred. In some implementations, to determine if an event has occurred, summary service 310 may include criteria that defines when one or more objects should be classified as an event. For example, if three objects indicated that a celebrity passed away, then that may qualify as generating an event.

In the present example, a document, an image, and an audio file have been classified as an event by summary service 310. In some implementations, summary service 310 may use speech to text functionality, as well as the metadata of the objects to determine the content of the objects. Once an event is identified, summary service 310 may, at step 2, identify supplementary information for the event. This information may be obtained from supplementary sources 331, or obtained from one or more additional objects of information sources 330. For example, summary service 310 may identify that the current event is related to a second event, and may determine one or more objects to be added to the event based on the relation. Additionally, or in place of the supplemental information from information sources 330, summary service 310 may obtain information from supplementary sources 331, wherein the information may include database information to supplement the event. For example, if the event comprised a result of a sports game, supplementary sources 331 may be consulted to develop background information on the players of the game that may not be included in the initial objects used in identifying the event.

After an event is identified and any supplementary information is obtained for the event, summary service 310, at step 3, may generate summaries for a user using the objects identified for the event. In some implementations, the summaries generated by summary service 310 may be generated prior to a request from an end user, however, it should be understood that the summaries may be provided in response to a request by a user. These summaries may include text based summaries, may include images, graphs, audio files, or some other similar summary of a particular event. For example, if an event included the merger of two companies, then a summary may be generated that includes a paragraph summary of the merger derived from data points in the objects for the event.

In the present implementation, in providing the summaries, a user of summary service 310 may be provided with an interface where the user may be provided with the ability to select events of interest, as well as a summary that is relevant to the type of interest. As an example, a user may request and be provided with a list of the ten most recent events identified by summary service 310. This list may include headlines derived at least in part from the objects for the events. Once the events are provided, the user may be provided with the ability to select an event and a type of summary for the event. This first type of summary may be provided to the user as a default summary or may be provided based on a selection of a type of summary for the user. For example, the summary service may provide the user with a selection of available summary types, and the user may select a summary type from the selection.

Once a first type of summary is selected by the user for a particular event, the summary maybe provided to the user based on information in the data objects identified for the event. In addition to the summary, the user may also be provided with a selection of second types of summaries, wherein the user may select a summary from the second types of summaries to provide different information about the event. In some implementations, the summary types that are provided to the user may include summary types based on a variety of factors. These factors may include data points identified from the objects that qualify for the event, previous types of summaries that the user has selected, summary types selected by other users of the summary service, or some other type of information from the event and/or the user. In some implementations, the types of summaries may also be prioritized based on the selection of other users in relation to an event. As an illustrative example, if for a particular event, other users have selected number summaries over other types of summaries, then a new user may be provided with a selection of summaries, wherein the number summary operation is promoted over other types of summaries that are provided to the user. Although this is one example of promoting summaries, it should be understood that are other operations may be used in addition to or in place of the selections of other users.

In some implementations, in selecting the summary types that are provided to a user for an event, summary service 310 may determine a score for each of the summary types, wherein the score may be generated based on the data points, the previous selections of the current user, the previous selections of other users, and/or some other similar factor. Once the scores are determined for the various summary suggestions, summary service 310 may then identify a subset of the summary suggests that meet suggestion criteria. For example, summary service 310 may identify summary suggestions with the top five scores. Further, in some examples, in providing the summary suggestions to the requesting user, the suggestions may be prioritized. As an example, the scores generated to identify the subset of suggestions may be used to prioritize the suggestions that are provided to the user. These prioritized suggestions may be provided as a list, may be provided with visual emphasis on particular suggestions over other suggestions, or may be provided in any other similar manner.

Figure 4:
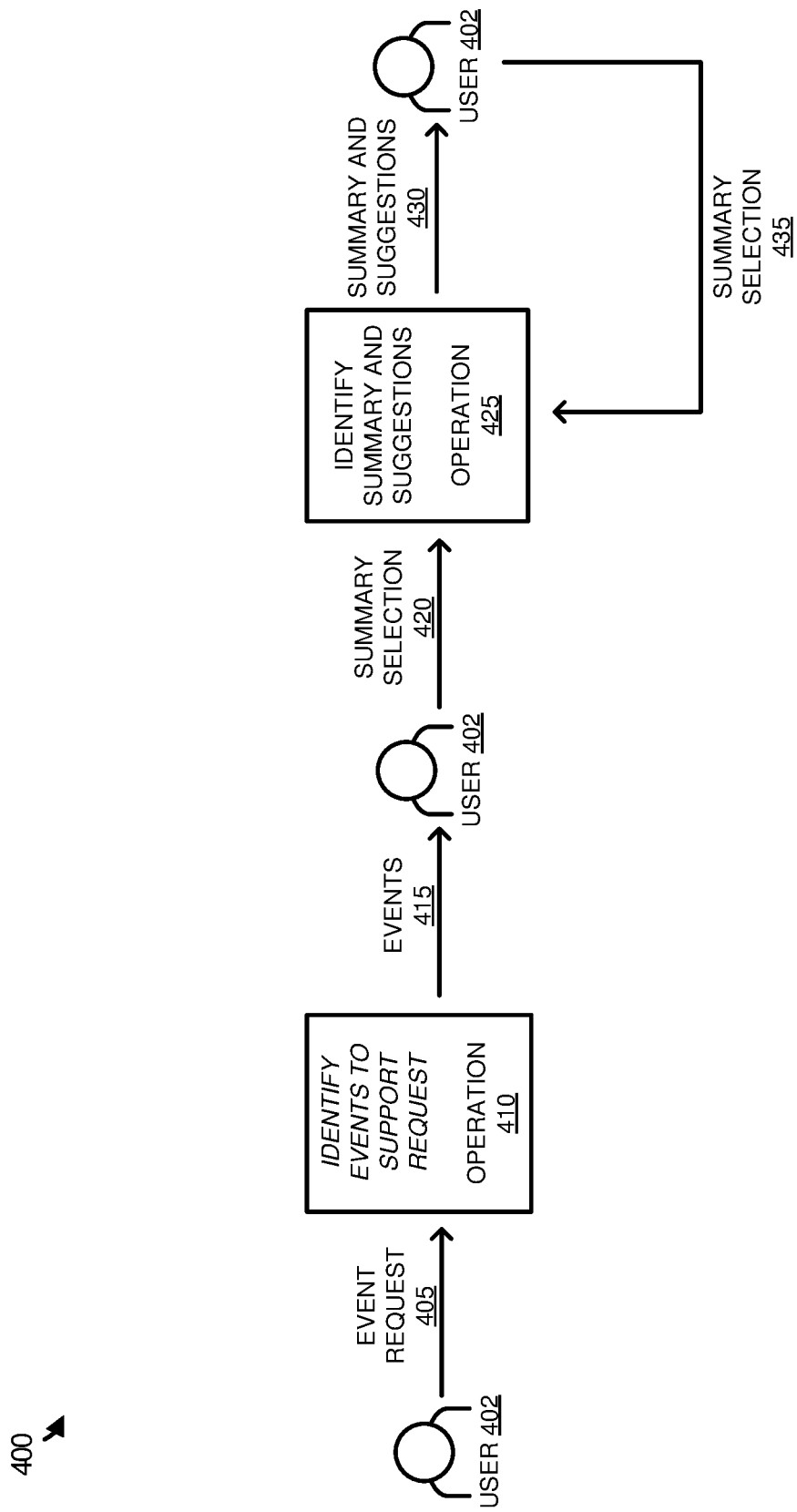
FIG. 4 illustrates an operational scenario of providing multi-source event summarization according to an implementation.

FIG. 4 illustrates an operational scenario 400 of providing multi-source event summarization according to an implementation. Operational scenario 400 includes user 402 that is interacting with a summary service to obtain summaries of various events.

As depicted in operational scenario 400, user 402 generates an event request that is identified by the summary service. For example, user 402 may request the ten most popular events related to a particular corporation. In response to the request, the summary service may perform operation 410 to identify events to support the request. Returning to the example of the ten most popular events, the summary service may monitor the requests of other users of the service to identify the events that are the most popular. These events are identified from objects ingested by the service, wherein the information (or data points) within the objects are used to identify various events. This information or data points may include dates, numbers, names, locations, or other similar information to identify a particular event.

Once operation 410 is complete, the events 415 that correspond to the request are provided to user 402. For example, user 402 may interact with the summary service using a personal device, such as a smart phone, tablet, personal computer, or some other similar device. As a result, when user 402 requests a selection of events, the summary service may provide, and the end user device may display, the selection of events for the end user. In some implementations, in addition to providing the user with a selection of events, the summary service may also provide the user with a first selection of available summary types. These selections may be determined based on a variety of factors, including the types of events that are identified to be provided to the user, previous summary selections of the user, selections by other users, the information within the events, or some other similar type of factor, including combinations thereof.

After the user is provided with events 415, user 402 may make summary selection 420 that is identified by the summary service. Using the example of providing the user with the ten most popular events, the user may make a selection of a summary type and the event of interest. This selection may be made by the user providing feedback at the end user device, wherein the feedback may comprise feedback from a touch interface, a keyboard a mouse, or some other user interface device. For example, a user may use a keyboard to select or type the event of interest and select the type of summary requested for the event of interest. Once the user provides summary selection 420, then operation 425 identifies a summary for the request and determines suggestions of event summary types. In some implementations, the summary that is provided to the user may be generated prior to the user request, however, it should be understood that the summary may generated in response to the user request. This summary may include data points and other information derived from the data objects associated with the event, wherein the summary may comprise a text based summary, a graph based summary, an image based summary, or some other type of summary including combinations thereof. As an example, a user may select a default summary for an event, wherein the default summary generates a paragraph describing information related to the event. This paragraph may include text and quotes from the objects that are associated with the event, and may also include natural language generated by the summary service using data points and information from the objects.

In addition to providing the summary, operation 425 is also used in providing the user with additional summary types for the event. These additional summary types may be determined based on previous selections of the user, the types of data points identified within the event, the selections of other users regarding an event, or some other similar factor, including combinations thereof. In some implementations, in determining the summary types for user 402, the summary service may be used to prioritize and/or promote particular types of summaries over other types of summaries. For example, if user 402 selects a quote based summary over other types of summaries, then summary service may promote the quote based summary for selection by the user over other types of summaries. Although this is one example of selecting the summary types to be provided to the user, it should be understood that any of the aforementioned factors may be used in prioritizing or promoting summary types to be provided to the end user.

In the present implementation, summary and suggestions 430 are provided to user 402 based at least on the first request for a summary by the end user. Once summary and suggestions 430 are provided to user 402, user 402 may make a second summary selection 435, wherein the selection indicates at least a summary type for a second summary. As an example, if summary and suggestion 430 included a default summary for a particular event, the user may desire to obtain more information about a particular topic (e.g. numbers, quotes, people of interest, and the like). Consequently, user 402 may provide an indication in summary selection 435 of the type of summary that they would like to receive. In response to obtaining the selection from user 402, operation 425 may process the selection to identify a new summary for user 402, as well as summary type suggestions to be provided to user 402. In this manner, the summary suggestions are dynamic based on the previous selections of the user, the types of data identified in the data objects for the event, and other similar information derived from users of the environment and the events identified therein.

In at least one implementation, the summary type suggestions that are provided to the user may be identified by determining which of the suggestions meet suggestion criteria. For example, the summary service may generate a score for each of the summary types in relation to an event. Once generated, a subset of the summary types may be identified to be supplied to the user based on the scores meeting criteria. For example, the summary types with the five highest scores may be selected to be provided to the users. In some implementations, in addition to using the scores to select the suggestions for the user, the scores may also be used in the prioritization of the summary suggestions. Thus, using the example of providing the five summary type suggestions to the user, the summary types may be placed in a list, one or more of the summary types may be highlighted, or some other similar method may be used in prioritizing the suggestions that are provided to the end user.

Figure 5:
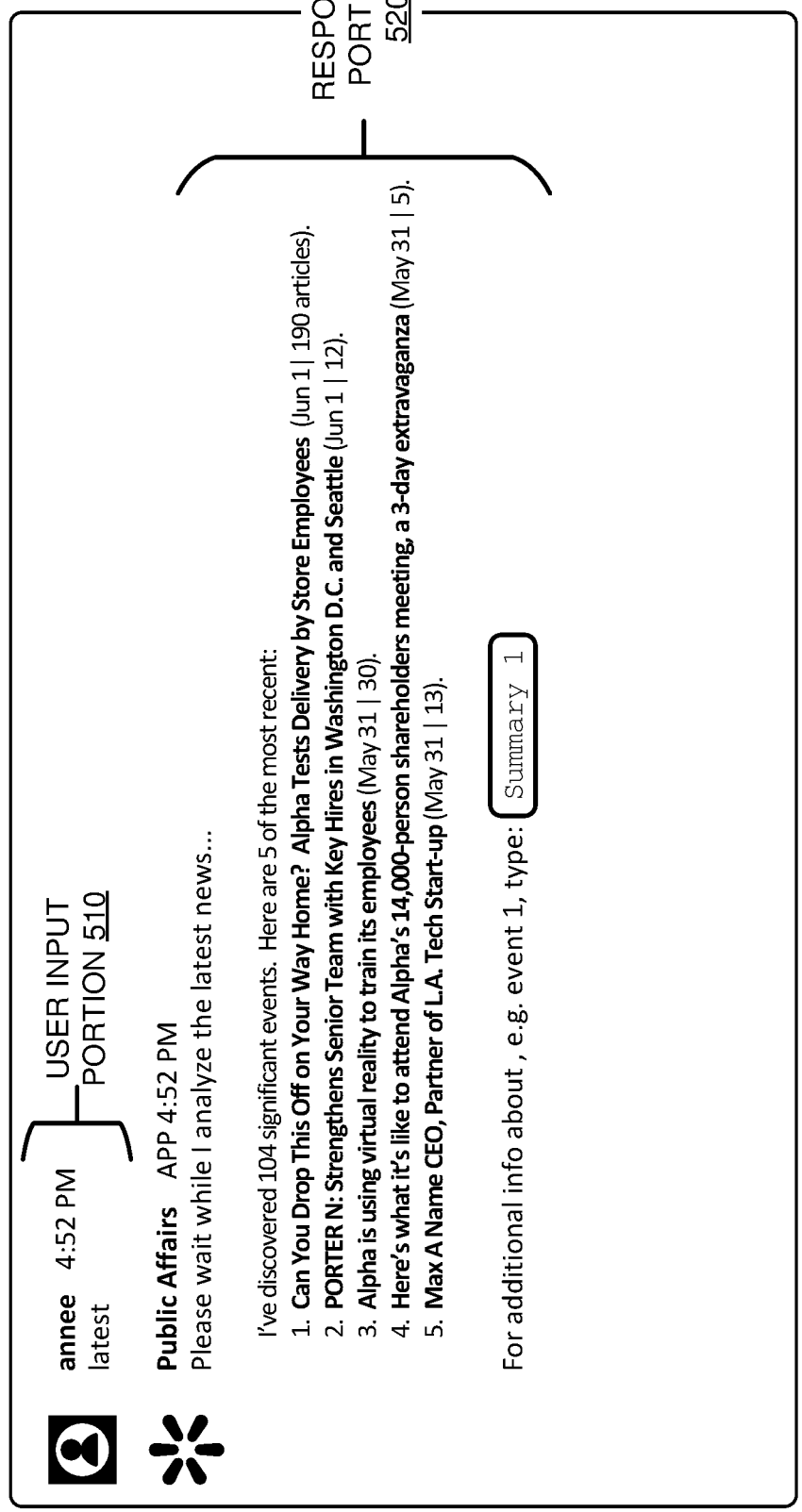
FIG. 5 illustrates a user interface for providing multi-source event summarization according to an implementation.

FIG. 5 illustrates a user interface 500 for providing multi-source event summarization according to an implementation. User interface 500 includes user input portion 510 and response portion 520. User input portion 510 is representative of an area in user interface 500 for the user to provide a request for particular information, while response portion 520 is representative of an area in user interface 500 that provides feedback to the request.

In the present implementation a user provides, in user input portion 510, a request for the latest events identified by a summary service. The user may provide this request via a web browser, an application dedicated to the summary service, a messaging application, or some other application on the end user device. In response to the request, which may be communicated over a communication network to the summary service, the summary service generates and responds to the request with the most recently identified events. In the particular example of FIG. 5, the events are related to public affairs of company "Alpha," wherein the user may select the public affairs as a destination user in a messaging application in some examples.

Once the user requests the latest events, a list of the most recently identified events are provided to the user in response portion 520. Additionally, response portion 520 includes information about how the user may request a first summary of one of the events in the list of events.

Figure 6:
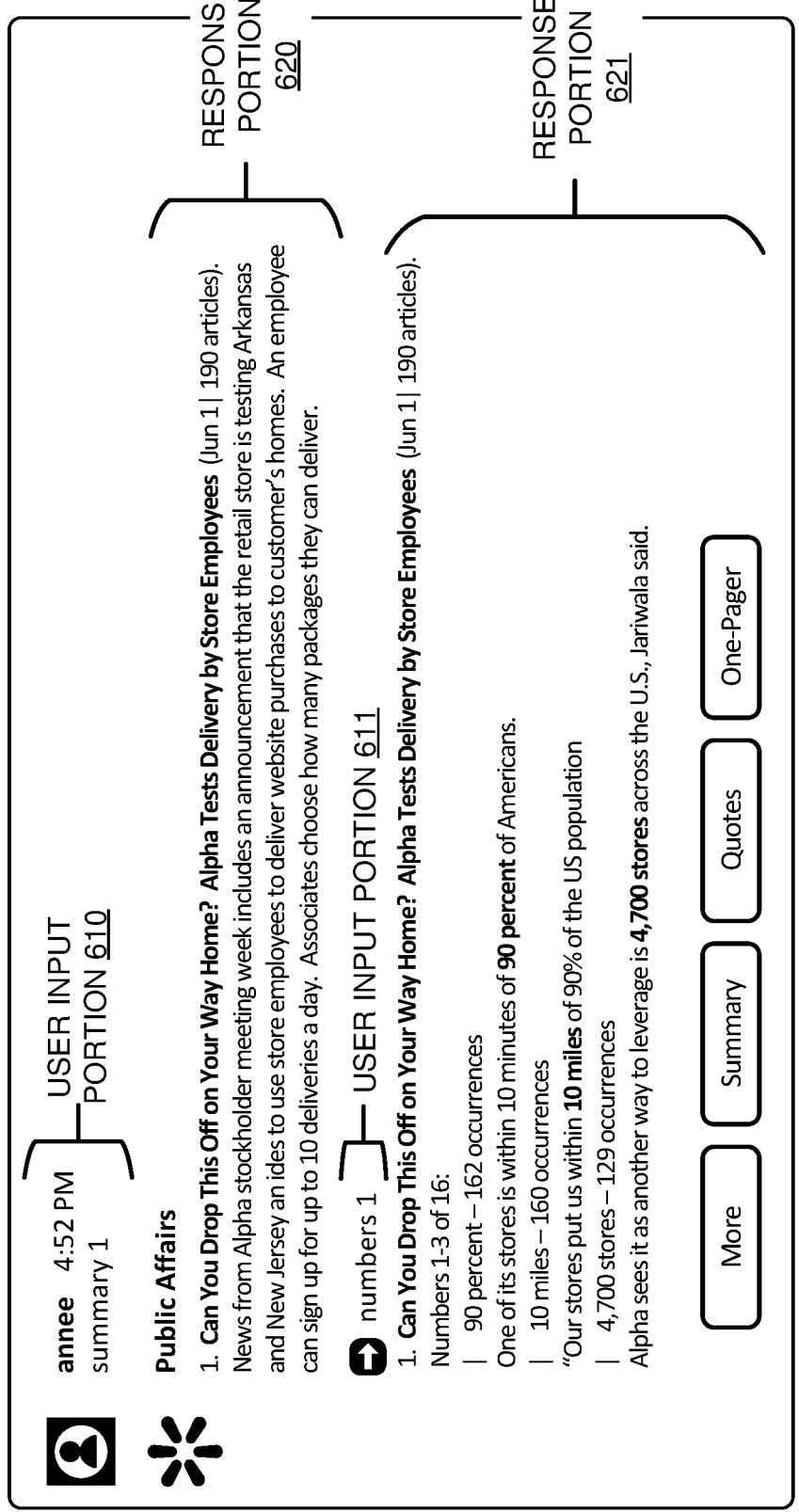
FIG. 6 illustrates a user interface for providing multi-source event summarization according to an implementation.

FIG. 6 illustrates a user interface 600 for providing multi-source event summarization according to an implementation. User interface 600 includes user input portions 610-611 and response portions 620-621. User input portions 610-611 are representative of areas in user interface 600 for the user to provide a request for particular information, while response portions 620-621 is representative of an area in user interface 600 that provides feedback to the requests.

In the example of FIG. 6, a user at user input portion 610 has requested a summary of the first event from a list of a plurality of events. In response to the request, the summary service returns a text based summary of the event in response portion 620. This text based summary may be derived from the objects used in identifying the event, and may include direct quotes from the objects, and may further include natural language generated using data points from the data objects (names, dates, numbers, and the like). Although the summary in the present example is demonstrated as a paragraph, it should be understood that a first type of summary provided to a user may take a variety of forms. This may include a longer or shorter text based summary, images, photos, videos, or some other type of summary, including combinations thereof.

In addition to the first summary type provided to the requesting user, the summary service is also used to identify suggestions on different summary types that might be more helpful to understanding the event. These identified summary types may be based on data points or types of data identified for the particular event (names, numbers, dates, and the like), previous selections by the current user, previous selections by other users for the event, or some other similar factor, including combinations thereof. For example, if a large amount of numbers were identified within an object, then a number based summary may be provided as a suggestion to the user over other types of summaries. In some examples, in providing the suggested summary types, the summary service may prioritize the summary types that appear as most relevant for the particular event. This prioritization may be based on the type of data for the event, preferences identified from previous summary type selections of the user, or trending selection types of other users.

In the present implementation, at user input portion 611, the user selects to receive a number summary of the first event, and is provided in response portion 621 with summary information for numbers identified within the objects for the event, along with suggestions for additional summary types derived as described above. In some implementations, the additional summary types provided to the user may further be based on the previous summary type selections for the user regarding the particular event.

Figure 7:
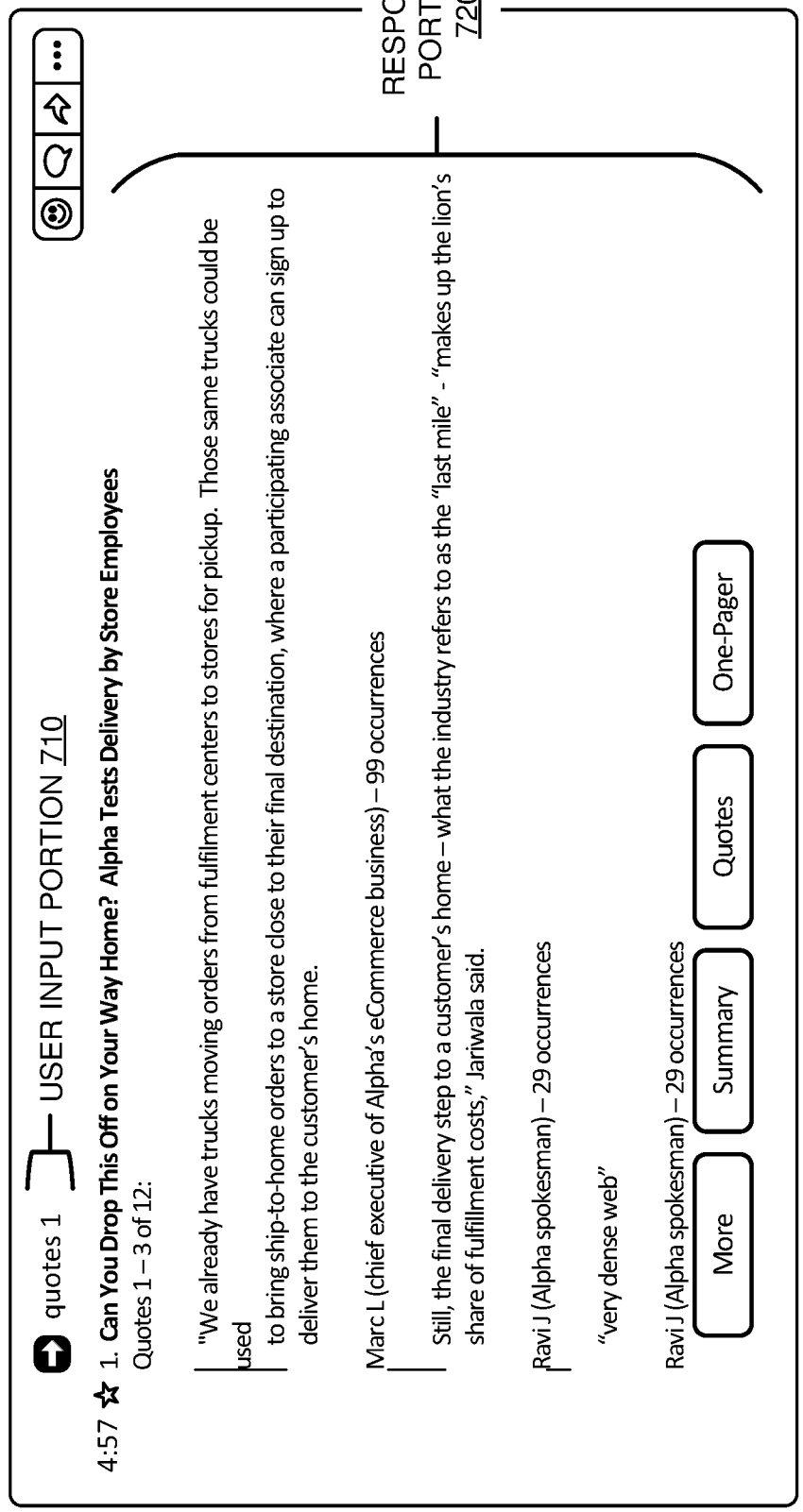
FIG. 7 illustrates a user interface for providing multi-source event summarization according to an implementation.

FIG. 7 illustrates a user interface 700 for providing multi-source event summarization according to an implementation. User interface 700 includes user input portion 710 and response portion 720. User input portion 710 is representative of an area in user interface 700 for the user to provide a request for particular information, while response portion 720 is representative of an area in user interface 700 that provides feedback to the request. User interface 700 represents a user interaction similar to that described in user interface 600 of FIG. 6, wherein the user, at user interface portion 710, provides a request for a particular summary type, in this example "quotes," and the summary service provides, at response portion 720, a summary corresponding to the requested type.

Figure 8:
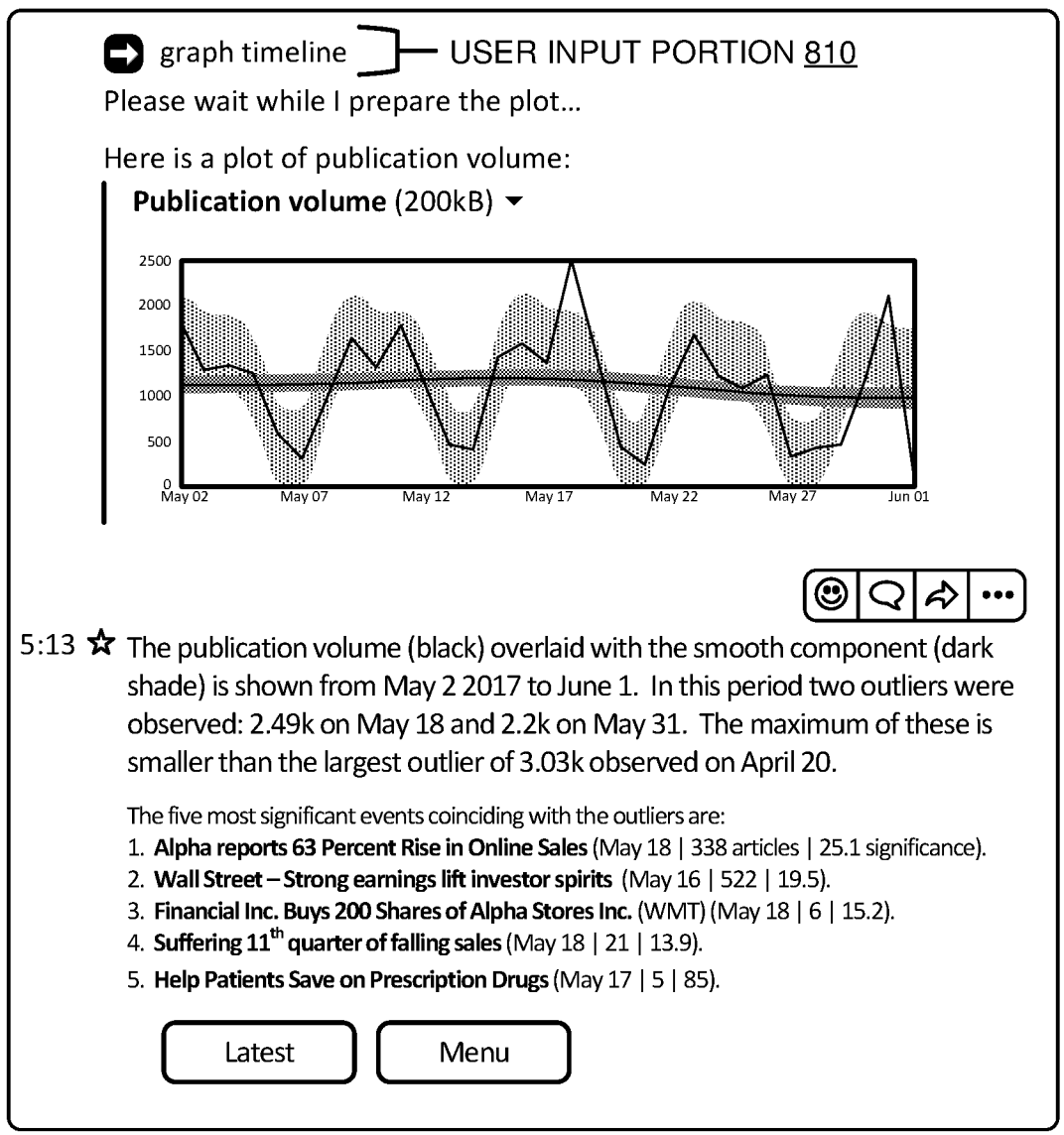
FIG. 8 illustrates a user interface for providing multi-source event summarization according to an implementation.

FIG. 8 illustrates a user interface 800 for providing multi-source event summarization according to an implementation. User interface 800 includes user interface portion 810, and is representative of a user interface that provides a graph summary to an end user. In particular, user interface 800 provides a graph of objects that qualify for events over time, and further includes information about the events that caused outliers in the graph. For example, a user may request to identify patterns in publications for a particular entity, such as in the present example, company "Alpha." In response to the request, summary service may plot objects that qualify as events for Alpha as well as identify anomalies of when a large number of objects qualified for a particular event.

Although this is one example of generating a graph, it should be understood that other graphs may be generated for events and objects. For example, if an event includes objects that provide percentages, the summary service may generate a graph (such as a pie diagram) based on the percentages within the objects.

Figure 9:
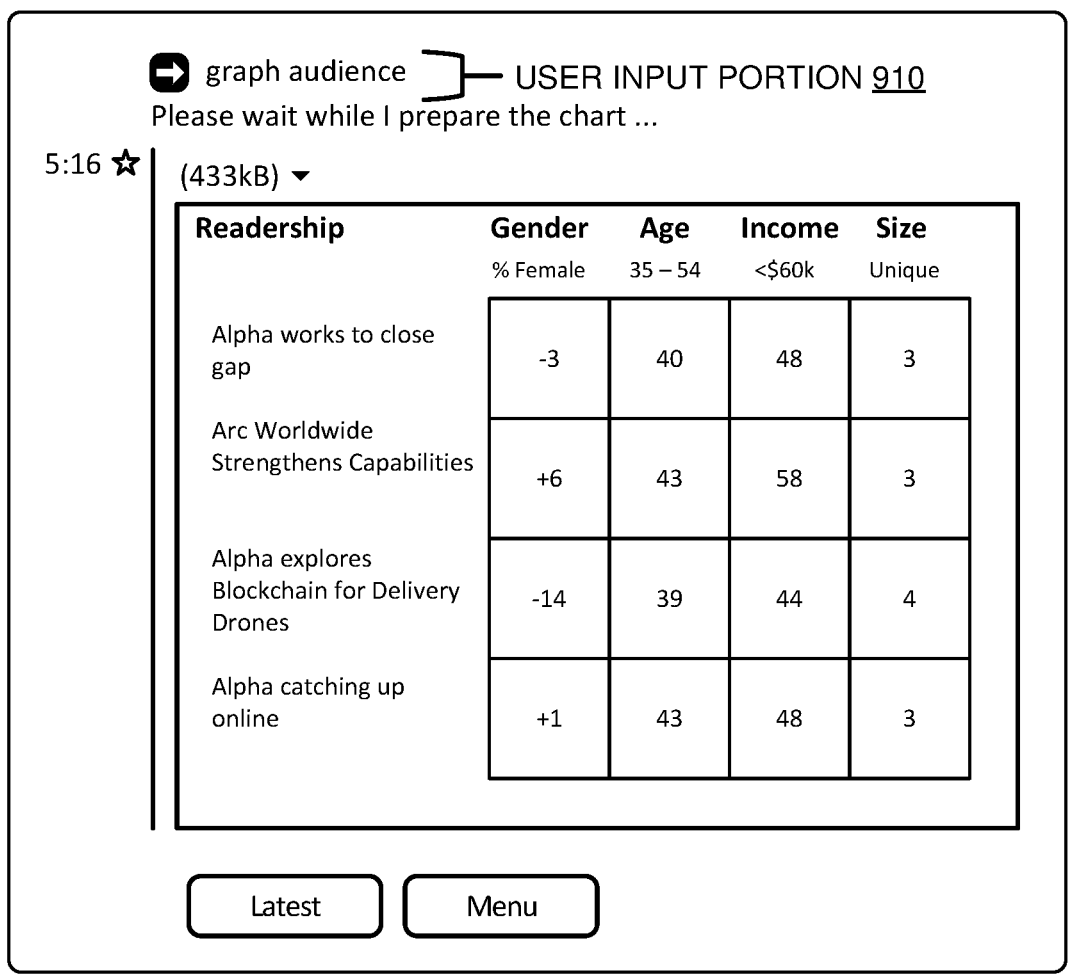
FIG. 9 illustrates a user interface for providing multi-source event summarization according to an implementation.

FIG. 9 illustrates a user interface 900 for providing multi-source event summarization according to an implementation. User interface 900 includes user interface portion 910, and is representative of a user interface that provides a graph summary to an end user. In the particular example, the user at user interface portion 910 requests audience information for identified events. In response to the request, the summary service will identify data for the graph and generate the required graph for the user. Additionally, the summary service may provide additional summary type suggestions to the user, wherein the additional summary types may be based on the previous summary type selected, the data points for the object, tendencies for the user in responding to other events, or some other type of information, including combinations thereof.

Figure 10:
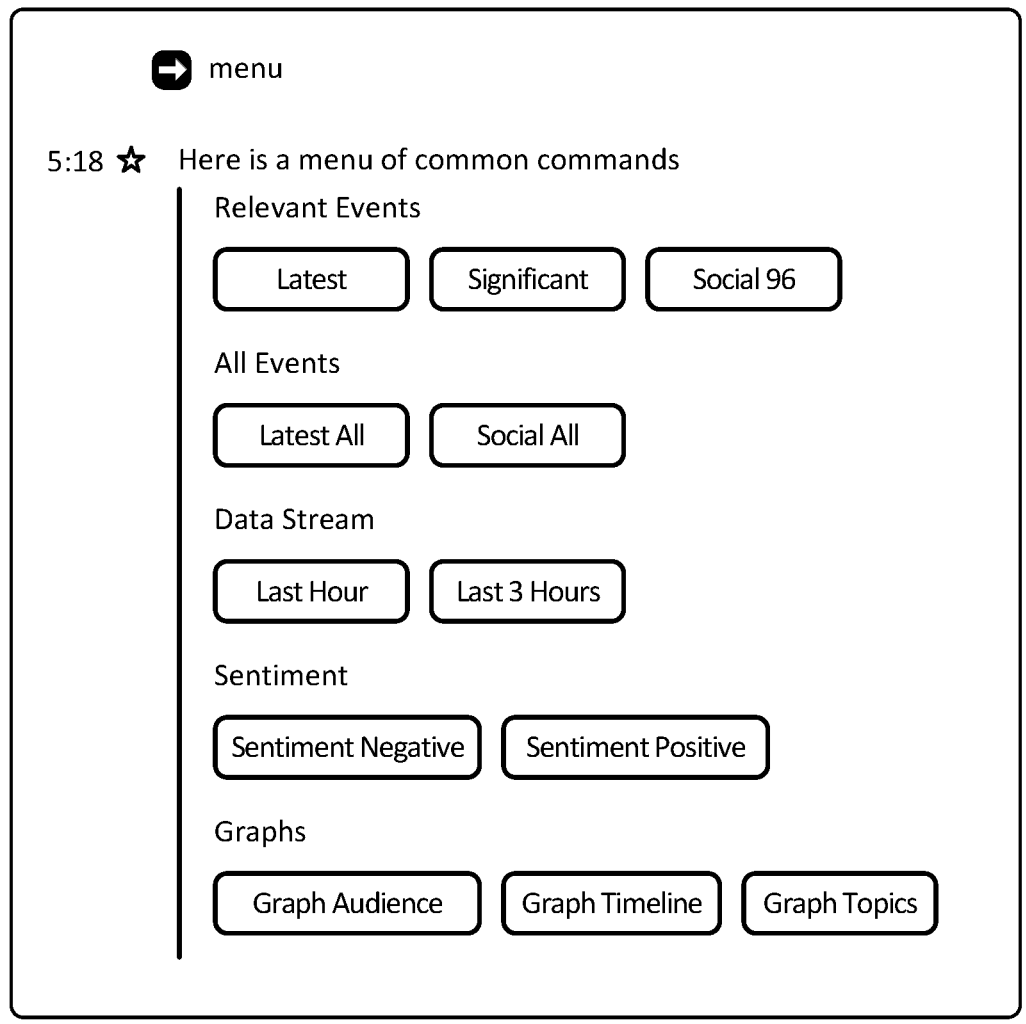
FIG. 10 illustrates a user interface for providing multi-source event summarization according to an implementation.

FIG. 10 illustrates a user interface 1000 for providing multi-source event summarization according to an implementation. User interface 1000 is representative of information that may be provided to the user when the user requests a "menu" of all of the available commands. Thus, rather than suggestions provided by the summary service, when the user provides the term "menu" in a user input portion, the summary service provides a list of all of the available commands to the user. Although twelve commands or options are provided in the example of FIG. 10, it should be understood that any number of commands may be provided to the user when the user requests a menu of available commands.

Figure 11:
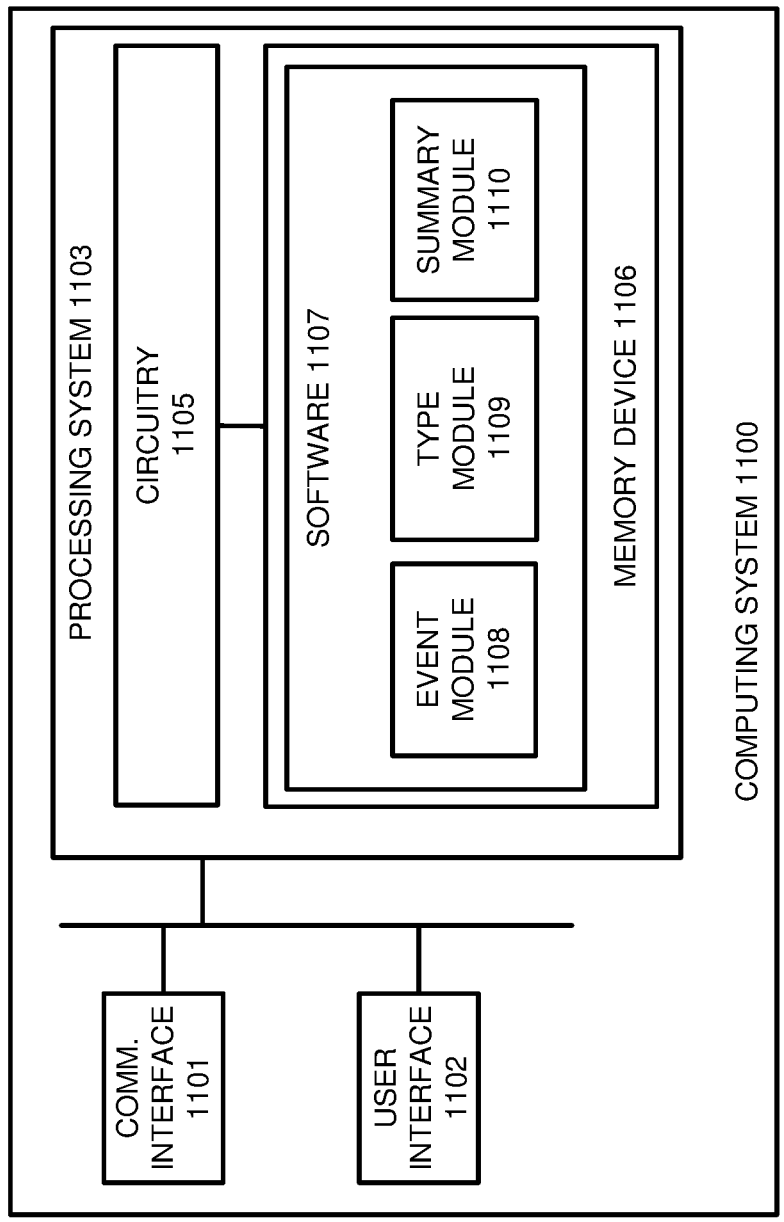
FIG. 11 illustrates a computing system to provide multi-source event summarization according to an implementation.

FIG. 11 illustrates a computing system 1100 to provide multi-source event summarization according to an implementation. Computing system 1100 is representative of any computing system or systems with which the various operational architectures, processes, scenarios, and sequences disclosed herein for an event summary service may be implemented. Computing system 1100 is an example of summary service 110 and 310, although other examples may exist. Computing system 1100 comprises communication interface 1101, user interface 1102, and processing system 1103. Processing system 1103 is linked to communication interface 1101 and user interface 1102. Processing system 1103 includes processing circuitry 1105 and memory device 1106 that stores operating software 1107. Computing system 1100 may include other well-known components such as a battery and enclosure that are not shown for clarity.

Communication interface 1101 comprises components that communicate over communication links, such as network cards, ports, radio frequency (RF), processing circuitry and software, or some other communication devices. Communication interface 1101 may be configured to communicate over metallic, wireless, or optical links. Communication interface 1101 may be configured to use Time Division Multiplex (TDM), Internet Protocol (IP), Ethernet, optical networking, wireless protocols, communication signaling, or some other communication format—including combinations thereof. In some implementations, communication interface 1101 may be configured to communicate with information and supplemental resources to obtain objects for defining events. In some examples, communication interface 1101 may be in communication with one or more console devices for end users to provide and receive summary information from the end users.

User interface 1102 comprises components that interact with a user to receive user inputs and to present media and/or information. User interface 1102 may include a speaker, microphone, buttons, lights, display screen, touch screen, touch pad, scroll wheel, communication port, or some other user input/output apparatus—including combinations thereof. User interface 1102 may be omitted in some examples. In some implementations, user interface 1102 may be used in obtaining user summary requests.

Processing circuitry 1105 comprises microprocessor and other circuitry that retrieves and executes operating software 1107 from memory device 1106. Memory device 1106 may include volatile and nonvolatile, removable and non-removable media implemented in any method or technology for storage of information, such as computer readable instructions, data structures, program modules, or other data. Memory device 1106 may be implemented as a single storage device, but may also be implemented across multiple storage devices or sub-systems. Memory device 1106 may comprise additional elements, such as a controller to read operating software 1107. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 1105 is typically mounted on a circuit board that may also hold memory device 1106 and portions of communication interface 1101 and user interface 1102. Operating software 1107 comprises computer programs, firmware, or some other form of machine-readable program instructions. Operating software 1107 includes event module 1108, type module 1109, and summary module 1110, although any number of software modules may provide the same operation. Operating software 1107 may further include an operating system, utilities, drivers, network interfaces, applications, or some other type of software. When executed by processing circuitry 1105, operating software 1107 directs processing system 1103 to operate computing system 1100 as described herein.

In one implementation, event module 1108 directs processing system 1103 to identify events based on data objects from various sources. In identifying an event, event module 1108 may consider data points within the objects, the time period when the events were identified, or some other relevant information about the data objects to identify an event. Once an event is identified, information may be provided to a user in the form of a summary. In particular, a user may select a summary type for an event, and be provided with a summary of the requested type.

In providing the user with the available types of summaries, type module 1109 is provided, wherein type module 1109 directs processing system 1103 to identify summary type suggestions based on a variety of factors. These factors may include, but are not limited to, the types of data or data points within the objects used to define an event, previous selections from the user regarding previous events, and/or selections from other users of the service. As an example, a user may select that they want information about a first event. In response to the selection, computing system 1100 may use type module 1109 to identify the types of summaries that might be most relevant to the particular event using the aforementioned factors. In at least some implementations, in identifying the suggested summary types, summaries may develop a score using the available factors, and a subset of summary types may be provided that meet defined criteria. Thus, if fifteen different summary types are available, each of the summary types may have a score generated based on the factors, and a subset of the identified factors may be identified that meet criteria. In some examples, in providing the available summary types to a user, computing system 1100 may prioritize the summary types based on the scores for each of the factors. This prioritization may provide the subset of summary types to the user as a list, or may highlight or emphasize particular summary types that with higher scores than other types, or may prioritize the summary types in any other similar manner.

In addition to identifying the summary types to be provided to a user of computing system 1100, summary module 1110 is further configured to provide summaries as they are requested by a user. In some implementations, the summaries may be generated prior to the request from a user, however, it should be understood that the summaries may be generated as described herein at the time of the request by the user. For example, if a user requested a summary on the most relevant numbers for the event, summary module 1110 may identify the data points within the objects that are relevant to the summary selection, and generate a summary based at least on the identified points. Further, a log of the summary type selections may be maintained by computing system 1100 to be used in selecting summary types to be provided to the user for future events.

Returning to the elements of FIG. 1, information sources 122 and supplemental sources 124 may comprise websites and/or databases capable of providing news stories, social media posts, blog posts, images, and other similar types of objects to summary service 110. Information sources 122 and supplemental sources 124 may each comprise one or more communication interfaces and network interfaces, processing systems, computer systems, microprocessors, storage systems, storage media, or some other processing devices or software systems. Information sources 122 and supplemental sources 124 may each comprise one or more serving computing systems, desktop computing systems, or some other similar computing system.

Summary service 110 comprise communication interfaces and network interfaces, processing systems, computer systems, microprocessors, storage systems, storage media, or some other processing devices or software systems, and can be distributed among multiple devices. Summary service 110 may include software such as an operating system, logs, databases, utilities, drivers, networking software, and other software stored on a computer-readable medium.

Communication between the summary service 110 and sources 122 and 124 may use metal, glass, optical, air, space, or some other material as the transport media. Communication between the host computing system and other computing nodes 130 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between the summary service 110 and sources 122 and 124 may be a direct link or can include intermediate networks, systems, or devices, and can include a logical network link transported over multiple physical links.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a summary service to provide event summary information, the method comprising:
    providing a user with identifiers for a plurality of events, wherein the plurality of events is identified from a plurality of sources, and wherein the plurality of events comprises political events, sporting news events, popular culture events, corporate events, legal proceedings, or entities;
    obtaining a selection of an identifier for an event from the plurality of events;
    providing the user with a first summary of a first type for the event, wherein the summary is derived from a plurality of documents for the event from at least a portion of the plurality of sources, wherein the first type comprises a text-based summary with sentences generated from the plurality of documents, and wherein the plurality of documents comprises at least one article;
    identifying one or more suggested types of summaries from a plurality of possible types of summaries for the event based at least in part on quantities that different types of data points appear in the plurality of documents for the event, wherein the different types of data points comprise names, dates, numbers, quotes, or locations, aoci wherein the plurality of possible types of summaries comprises two or more of: a timeline, a graph, a video, or an image, and wherein identifying the one or more suggested types of summaries for the event comprises:
        generating a score for each summary type of the plurality of summary types based at least in part on the quantities that different types of data points appear in the plurality of documents for the event; and
        identifying the one or more suggested types of summaries of the plurality of summary types with scores that meet suggested criteria;
    prioritizing the one or more suggested types of summaries based on the scores; and
    providing the prioritized one or more suggested types of summaries to the user for a selection of a summary type by the user.

2. The method of claim 1 further comprising identifying summary type selections by one or more other users for the event, and wherein identifying the one or more suggested types of summaries for the event is further based on the summary type selections by one or more other users for the event.

3. The method of claim 1 further comprising identifying the plurality of events based on objects obtained from the plurality of sources, wherein the objects comprise at least the plurality of documents.

4. The method of claim 3, wherein the objects further comprise social media posts, images, videos, or audio files.

5. The method of claim 3, wherein the plurality of sources comprises webpages or feeds.

6. A computing apparatus comprising:
    one or more non-transitory computer readable storage media;
    a processing system operatively coupled to the one or more non-transitory computer readable storage media; and
    program instructions stored on the one or more non-transitory computer readable storage media to provide event summary information that, when read and executed by the processing system, direct the processing system to at least:
        provide a user with identifiers for a plurality of events, wherein the plurality of events is identified from a plurality of sources, and wherein the plurality of events comprises political events, sporting news events, popular culture events, corporate events, legal proceedings, or entities;
        obtain a selection from the user, wherein the selection indicates an identifier for an event of the plurality of events, wherein each of the events is associated with at least a plurality of documents, and wherein the plurality of documents comprises at least one article;
        identify one or more suggested types of summaries from a plurality of possible types of summaries for the event based at least in part on previous summary type selections by the user to previous events and quantities that different types of data points appear in the plurality of documents for the event, wherein the different types of data points comprise names, dates, numbers, quotes, or locations, and wherein the plurality of possible types of summaries comprises two or more of: a text-based summary with sentences generated from the plurality of documents, a timeline, a graph, a video, or an image, and wherein identifying the one or more suggested types of summaries for the event comprises:
            generating a score for each summary type of the plurality of summary types based at least in part on the quantities that different types of data points appear in the plurality of documents for the event; and
            identifying the one or more suggested types of summaries of the plurality of summary types with scores that meet suggested criteria;

prioritize the one or more suggested types of summaries based on the scores; and provide the prioritized one or more suggested types of summaries to the user for a selection of a summary type by the user.

7. The computing apparatus of claim 6, wherein identifying the one or more suggested types of summaries for the event is further based on summary type selections by one or more other users for the event.

8. The computing apparatus of claim 6, wherein the program instructions further direct the processing system to identify the plurality of events based on objects obtained from the plurality of sources, wherein the objects comprise at least the plurality of documents.

9. The computing apparatus of claim 8, wherein the objects further comprise social media posts, images, videos, or audio files.

10. An apparatus comprising:

one or more non-transitory computer readable storage media; and program instructions stored on the one or more non-transitory computer readable storage media to provide event summary information that, when read and executed by a processing system, direct the processing system to at least:

provide a user with identifiers for a plurality of events, wherein the plurality of events is identified from a plurality of sources, and wherein the plurality of events comprises political events, sporting news events, popular culture events, corporate events, legal proceedings, or entities;

obtain a selection from the user, wherein the selection indicates an identifier for an event of the plurality of events, wherein each of the events is associated with at least a plurality of documents, and wherein the plurality of documents comprises at least one article;

identify one or more suggested types of summaries from a plurality of possible types of summaries for the event based at least in part on previous summary type selections by the user to previous events and quantities that different types of data points appear in the plurality of documents for the event, wherein the different types of data points comprise names, dates, numbers, quotes, or locations, wherein the plurality of possible types of summaries comprises two or more of: a text-based summary with sentences generated from the plurality of documents, a timeline, a graph, a video, or an image, and wherein identifying the one or more suggested types of summaries for the event comprises:

generating a score for each summary type of the plurality of summary types based at least in part on the quantities that different types of data points appear in the plurality of documents for the event; and identifying the one or more suggested types of summaries of the plurality of summary types with scores that meet suggested criteria;

prioritize the one or more suggested types of summaries based on the scores; and provide the prioritized one or more suggested types of summaries to the user for a selection of a summary type by the user.

* * * * *